Figure 1:
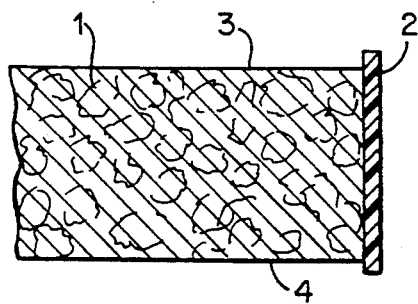

United States Patent [19]

Veldhoen

[11] Patent Number: 5,056,279

[45] Date of Patent: Oct. 15, 1991

[54] FLAT PANEL AND METHOD FOR FABRICATING IT

[76] Inventor: George G. Veldhoen, Staartmolen 3, 3352 BA Papendrecht, Netherlands

[21] Appl. No.: 517,572

[22] Filed: May 1, 1990

Related U.S. Application Data

[63] Continuation of Ser. No. 250,382, Sep. 28, 1988, abandoned.

[30] Foreign Application Priority Data

Sep. 29, 1987 [NL] Netherlands .......................... 870234

[51] Int. Cl.⁵ .............................................. E04B 1/84
[52] U.S. Cl. ........................................ 52/144; 52/488; 181/290; 181/291
[58] Field of Search ............... 52/144, 145, 484, 488; 181/284, 290, 291

[56] References Cited

U.S. PATENT DOCUMENTS

| | | | |
|---|---|---|---|
| 1,927,879 | 9/1933 | Spafford | 52/406 |
| 2,113,068 | 4/1938 | McLaughlin | 52/406 |
| 2,779,066 | 1/1957 | Gaugler | 52/406 |
| 4,146,999 | 4/1979 | Petrovec | 52/145 |
| 4,284,674 | 8/1981 | Sheptak | 52/406 |
| 4,545,166 | 10/1985 | Kielmeyer | 52/484 |
| 4,553,631 | 11/1985 | Panza | 181/291 |
| 4,574,099 | 3/1986 | Nixon | 181/291 |

Primary Examiner—John E. Murtagh
Attorney, Agent, or Firm—Wolf, Greenfield & Sacks

[57] ABSTRACT

The present invention provides a novel panel for ceiling assemblies, wall assemblies or the like. The panel comprises a self-supporting core of a soft filling material and reinforcement elements, preferably plastic strips, for defining the shape of the panel after a film is applied surrounding said core and reinforcement elements. Moreover the present invention relates to a novel method of fabricating such a panel.

16 Claims, 1 Drawing Sheet

FLAT PANEL AND METHOD FOR FABRICATING IT

This application is a continuation of application Ser. No. 07/250,382, filed Sept. 28, 1988, now abandoned.

The invention relates to a flat panel according to the precharacterizing part of claim 1.

There are flat panels known in which the filling material of said core comprises mineral wool, whereas the surrounding shrinking film for example comprises a film from polyvinylfluoride. Panels fabricated like this are among others applied in spaces where there are stringent demands with respect to the hygienics or with respect to the amount of dust particles, such as spaces where food products are manufactured or packed, such as in the dairy industry, in slaughter houses or in production rooms for the fabrication of electronic components such as chips or the like. The core comprising mineral wool has good sound damping properties, as is of great importance for minimizing the sound level in spaces that are sensible herefore. The shrinking film is easy cleanable as is very favourable with respect to the stringent demands. In this known panels the reinforcement elements provide the self-supporting capacity of the panels. For this reason these reinforcement elements are rather heavy and generally undeformable. As a result the mounting thereof in supporting elements is extremely difficult whereas often a damaging of the film occurs during said mounting.

In the assembled situation of the panels, this means when they are mounted on supporting elements, the result often is that the panels with their corners do not completely contact the flanges, such that at those spots small cavities are formed between the panels and the supporting elements. These cavities are difficult to reach when cleaning and disinfecting the panel assembly and can provide a possible breeding place for bacteria and the like. Therefore, the known panels are not optimized in a hygienic point of view.

It is an object of the invention to provide a panel of the type referred to above removing said disadvantages in a very easy, but nevertheless effective way.

Therefore, the panel according to the invention is characterized in that the core is self-supporting whereas the reinforcement elements comprise thin flexible plastic strips that perpendicularly to the plane of the panel are substantially stiff but that perpendicularly to their own plane are slightly deformable and that in the latter direction are supported by the core.

By the thin flexible plastic strips applied to the narrow side faces of the core it is guaranteed, that at the one hand the final thickness of the panel is defined in an effective way. At the other hand the deformability of the plastic strips provides an excellent deformability of the panel during the assemblage whereas damaging the film is avoided. As a result although such a panel has over its entire surface a constant thickness these panels contact the supporting elements supporting said panels almost seamlessly. Because the thickness of completed panels is defined by the width of the applied plastic strips that are substantially stiff in the respective direction the panels do not or hardly have any differences in thickness among themselves. It is emphasized that the plastic strips do not significantly contribute to the self-supporting capacity of the panel; this is mainly a result of the consistency of the core.

According to an advantageous embodiment of the method according to the invention at first the plastic strips have a width being slightly greater than the width of the core and said strips are applied to the side faces of the such that they project at both sides from the upper and lower face of the core, whereafter the upper and lower face including the plastic strips is flattened and made parallel among themselves by means of an appropriate machining operation.

Like this the result is that the upper face and the lower face of a core comprising plastic strips are completely flat.

If according to a handy embodiment of the method according to the invention the plastic strips are attached to the core continuously, such as by adhesion or the like a proper and reliable joint between the plastic strips and the core is obtained.

According to the invention it is further advantageous if after flattening and prior to surrounding the core with the film an acoustic open fabric is applied onto the upper or lower face of the core and extending over the plastic strips.

This acoustic open fabric, for example a glass fabric, lowers the sensibility for damages of the film that has to be applied later.

Further it is handy, if according to a further embodiment after applying the acoustic open fabric and prior to surrounding the core with the film the acoustic open fabric is near to its circumferential edge provided with a continuous groove.

In a reliable way this groove defines the location where, during the shrinkage of a shrinking film to be applied later, an upset edge will be formed in the acoustic open fabric. By forming said groove near to the circumferential edge it can be guaranteed that after the panel has been mounted in a supporting element this upset edge is hided from the eye by means of said supporting element.

If the film is applied bag-like around the core and the plastic strips and is closed thereafter hermetically by means of a seal or the like, it is advantageous if prior to its closure the film bag is evacuated to some extent. As a result the film can be applied tightly around the core without puffing up due to air present in the film bag (which air is possibly heated and thus has expanded during shrinking of the film).

The invention further relates to a panel assembly comprising panels fabricated by means of the method according to the invention and supporting profiles supporting said panels. According to the invention the supporting profiles comprise I-profiles whereas the panels are with their margins applicable between the opposed flanges of an I-profile and wherein at least one of said flanges comprises at its margins a projection directed towards the other flange.

The projection provides for a line contact between the respective flange and a panel below said flange, such that a good seal is obtained.

Finally the invention relates to a supporting profile for application in a panel assembly according to the invention.

Hereafter the invention will be elucidated by means of the drawing in which an embodiment of the method according to the invention is illustrated.

Figure 5:
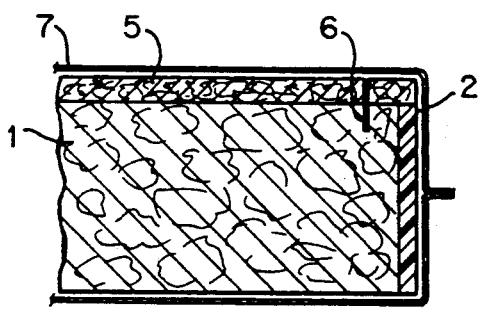
Figure 6:
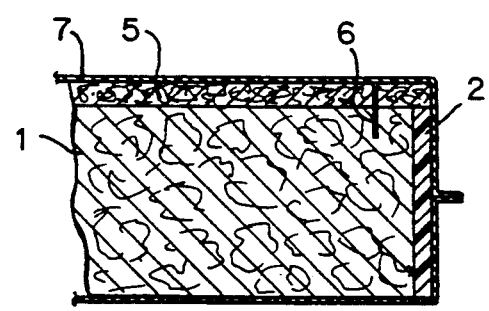
Figure 7:
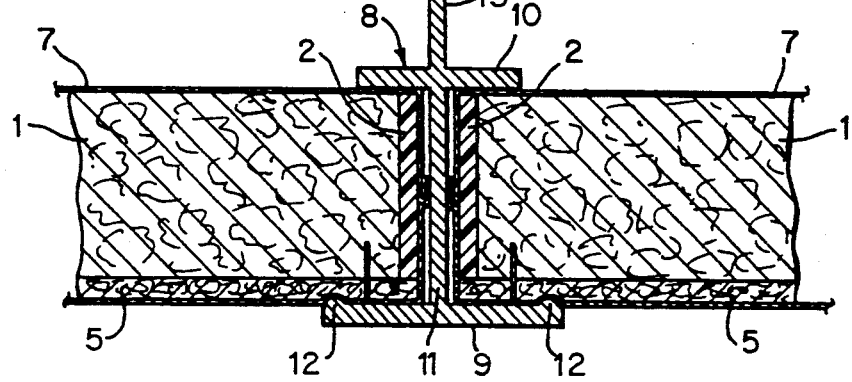

FIGS. 1–6 show successive steps of an embodiment of the method according to the invention, and FIG. 7 shows a fragment of an embodiment of a panel assembly according to the invention.

As first step of the method for fabricating a panel for application in ceiling assemblies, wall assemblies or the like FIG. 1 shows that on the narrow side faces of a core 1 thin plastic strips 2 are applied. The material of core 1 is a mineral wool, such as glass wool or rock wool. It is emphasized that in the figures always just one side edge of the core 1 is visible whereas the plastic strips 2 in reality extend totally around the core 1.

As appears clearly from FIG. 1 the plastic strips 2 at first have a width being slightly greater than the width of the core 1, whereby the plastic strips 2 project at both sides from the upper face 3 and the lower face 4 of the core 1.

Figure 2:
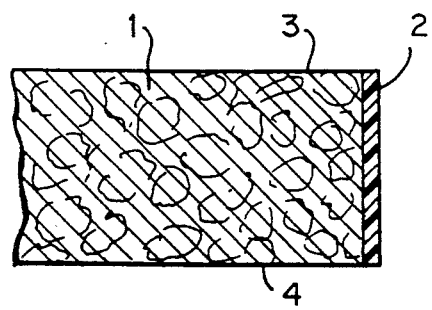

FIG. 2 shows the result after the next step of the method. Here the upper face 3 and the lower face 4 including the plastic strips 2 are flattened and made parallel among themselves by means of an appropriate machining-operation. It is possible that one of the faces of the core 1 (the upper face 3 or the lower face 4) is flattened by sanding, whereafter the core 1 with its face flattened like this is positioned onto a flat underground, whereafter the opposite face (the lower face 4 or the upper face 3) is also flattened by sanding, such that the upper face 3 and the lower face are both flattened and parallel among themselves. The plastic strips 2 then do not project from the upper face 3 and the lower face 4 any more but the ends of the said plastics strips 2 are exactly positioned in the planes of said faces.

It is noted that, especially for avoiding that the plastic strips 2 become loose from the core 1 while flattening the mentioned faces of the core, these plastic strips 2 by preference are attached to the core 1 continuously, such as be adhesion or the like.

Figure 3:
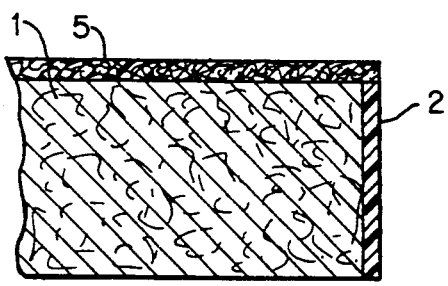
Figure 4:
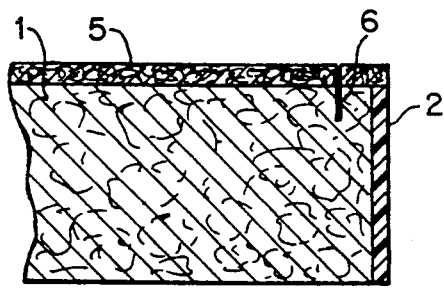

During the next step of the method, as shown in FIG. 3, onto the upper face 3 (or onto the lower face 3) of the core 1 an acoustic open fabric 5 is applied that extends over the plastic strips. This acoustic open fabric 5, by preference a glass fabric, constitutes a firm underground for a film to be applied later, such that damages to said film will less quickly occur.

After applying the acoustic open fabric 5, and still prior to surrounding the core 1 with the film, the acoustic open fabric 5 is near to its circumferential edge provided with a continuous groove 6. In the situation shown in FIG. 4 this groove 6 extends until in the core 1. The location in the groove 6 is chosen such, that it at one hand does not coincide with the location of the plastic strips 2 and at the other hand is located as close as possible to the circumferential edge of the panel, such, that when the panel is mounted later in a supporting element this groove is covered by said supporting element. While shrinking a shrinking film that has to be applied over the acoustic open fabric a possible upset edge of the fabric material will be formed at the groove 6 whereas the remaining parts of the panel are secured from such upset edges. Like this it is guraranteed that a completed panel always has an esthetic appearance.

Finally, FIGS. 5 and 6 show the application of a shrinking film 7 around an assembly of core 1, plastic strips 2 and acoustic open fabric 5. Applying such a shrinking film 7 occurs in a way known, in which (see FIG. 5) the film firstly is sealed at at least three sides of the panel, whereafter while evacuating (see FIG. 6) a seal is provided in the film at the fourth side of the panel. Finally the film 7 will be shrunk whereafter the panel is completed.

By means of the measures metioned the panels fabricated using the method according to the invention have a regular appearance.

In FIG. 7 a panel assembly is illustrated comprising panels that are fabricated by means of the method described before and comprising supporting profiles 8 supporting said panels, which profiles can be suspended in a known way by means of flanges 13 and mounting means 14. The supporting profiles 8 comprise an I-profile whereby the panels with there margins are applicable between the opposed flanges 9 and 10 of the I-profile 8. Here the web 11 of the I-profile 8 defines the separation between adjacent panels.

The flange 9 comprises at its margins projections 12 facing the flange 10, said projections gripping the side of the panels comprising the fabric 5. The recess enclosed by the flanges 9 and 10 has a width substantially equivalent to or only little smaller than the width of the panels. Such that these panels can be mounted clampingly in the I profiles 8. Hereby the projections 12 on the flange 9 provide an effective line contact as a result of which a proper seal is obtained.

The plastic strips 2 applied by the method can be made by extruded polystyrene or polyurethane. If desired such plastic strips can be broken, for example when replacing damaged panels during which operation it can be necessary to temporarily bend the panels.

The invention is not restricted to the embodiment described before but can be varied widely within the scope of the invention.

What is claimed is:

1. An acoustical panel for use with a supporting profile, the profile having a pair of opposing flanges between which an edge of the panel is positioned, the acoustical panel comprising:
   a flat panel comprising a self-supporting core of sound-proofing material and having a narrow side edge;
   thin flexible strips applied to the side edge and extending completely around the core to define a panel width of constant thickness, wherein the side edge of the panel may be positioned between a pair of opposing parallel flanges in a supporting profile to provide a substantially constant line contact between the flanges and panel, and wherein the strips are relatively light weight compared to the core and do not significantly contribute to the weight of the core nor to the self-supporting capacity of the core;
   wherein an acoustic open fabric is applied onto at least one of the faces of the core and extends over one end of the flexible strip, and
   wherein the acoustic open fabric is near to its circumferential edge provided with a continuous groove.

2. The panel of claim 1, wherein the groove extends into the core.

3. An assembly including an acoustical panel and supporting profile, the assembly comprising:
   a flat panel comprising a self-supporting core of sound-proofing material and having a narrow side edge;
   a profile having a pair of opposing parallel flanges between which the side edge of the panel is positionable;
   thin flexible strips applied to the side edge and extending completely around the core to define a panel width of constant thickness, wherein the side edge of the panel may be positioned between the opposing parallel flanges of the supporting profile to provide a substantially constant line contact between the flanges and panel, and wherein the strips are relatively lightweight compared to the core and do not significantly contribute to the weight of the core nor to the self-supporting capacity of the core;

wherein an acoustic open fabric is applied onto at least one of the upper and lower faces of the core and extends over the respective end of the flexible strip, and wherein the acoustic open fabric is near to its circumferential edge provided with a continuous groove, the groove extending into the core and being positioned within the flanges of the profile.

4. An acoustical panel comprising:
a self-supporting core of sound-proofing material forming a flat panel with opposing upper and lower faces and a narrow side edge;
thin flexible strips applied to the side edge and extending completely around the core to define a panel width of constant thickness; and
an acoustic open fabric applied onto at least one of the faces of the core and wherein the acoustic fabric is provided near to its circumferential edge with a continuous groove.

5. The acoustical panel of claim 4, wherein the core and strips are sealed within an outer film.

6. The acoustical panel of claim 4, wherein the groove extends into the core.

7. The acoustical panel of claim 6, wherein the core and strips are sealed within an outer film.

8. The acoustical panel of claim 4, wherein at least one end of the flexible strip lies in the plane of either the upper or lower face of the core.

9. The acoustical panel of claim 8, wherein both ends of the flexible strip lie in the respective planes of the upper and lower faces of the core.

10. The acoustical panel of claim 4, wherein the flexible strips are attached to the core continuously.

11. The acoustical panel of claim 4, wherein the acoustic open fabric extends over one end of the flexible strip.

12. The acoustical panel of claim 4, wherein the acoustic open fabric comprises glass fabric.

13. The assembly of claim 8, wherein the groove extends into the core.

14. The acoustical panel of claim 13, wherein the core and strips are sealed within an outer film.

15. An assembly including an acoustical panel and supporting profile, the assembly comprising:
a self-supporting core of sound-proofing material forming a flat panel with opposing upper and lower faces and a narrow side edge;
a profile having a pair of opposing parallel flanges between which the side edge of the panel is positionable;
thin flexible strips applied to the side edge of the panel and extending completely around the core to define a panel width of constant thickness, and an acoustic open fabric applied onto at least one of the faces of the core and wherein the acoustic fabric is provided near to its circumferential edge with a continuous groove, wherein the side edge of the panel and the groove may be positioned between the opposing parallel flanges of the supporting profile to provide a substantially constant line contact between the flanges and panel.

16. The assembly of claim 15, wherein the core and strip are sealed within an outer film.

* * * * *